United States Patent
Osakabe et al.

(10) Patent No.: US 9,085,425 B2
(45) Date of Patent: Jul. 21, 2015

(54) MULTIFUNCTION PERIPHERAL

(75) Inventors: Yoshinori Osakabe, Aichi (JP); Katsuro Miura, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 278 days.

(21) Appl. No.: 13/606,097

(22) Filed: Sep. 7, 2012

(65) Prior Publication Data

US 2013/0063750 A1 Mar. 14, 2013

(30) Foreign Application Priority Data

Sep. 9, 2011 (JP) ................................. 2011-196751

(51) Int. Cl.
*B65H 5/00* (2006.01)
*H04N 1/00* (2006.01)

(52) U.S. Cl.
CPC ............... *B65H 5/00* (2013.01); *H04N 1/0062* (2013.01); *H04N 1/00588* (2013.01); *H04N 1/00591* (2013.01); *H04N 1/00602* (2013.01); *H04N 1/00631* (2013.01); *H04N 1/0053* (2013.01); *H04N 1/00535* (2013.01); *H04N 2201/0094* (2013.01)

(58) Field of Classification Search
CPC ... B65H 5/00; B65H 2402/30; B65H 2801/39
USPC ...................... 271/3.14, 4.04, 10.04; 399/367
See application file for complete search history.

(56) References Cited

U.S. PATENT DOCUMENTS

| | | | |
|---|---|---|---|
| 4,921,239 A | 5/1990 | Okui et al. | |
| 7,660,548 B2 | 2/2010 | Muraki et al. | |
| 7,808,683 B2 | 10/2010 | Muraki et al. | |
| 2006/0018693 A1 | 1/2006 | Nobe et al. | |
| 2007/0127962 A1* | 6/2007 | Fukumura | 399/367 |
| 2007/0228644 A1 | 10/2007 | Muraki et al. | |
| 2009/0040572 A1 | 2/2009 | Shimmachi et al. | |
| 2009/0201559 A1 | 8/2009 | Yamada et al. | |

FOREIGN PATENT DOCUMENTS

| | | | | |
|---|---|---|---|---|
| JP | 61-064640 A | 4/1986 | | |
| JP | 61290434 A | * 12/1986 | ............ | G03B 27/34 |
| JP | 62-111838 A | 5/1987 | | |
| JP | H05219308 A | 8/1993 | | |
| JP | H06-002364 U | 1/1994 | | |
| JP | H0832767 A | 2/1996 | | |
| JP | 2001-222202 A | 8/2001 | | |
| JP | 2004-009664 A | 1/2004 | | |

(Continued)

OTHER PUBLICATIONS

Aug. 20, 2014—(US) Non-Final Office Action—U.S. Appl. No. 13/606,128.

(Continued)

*Primary Examiner* — Michael McCullough
(74) *Attorney, Agent, or Firm* — Banner & Witcoff, Ltd.

(57) ABSTRACT

A multifunction peripheral is provided that includes an ADF unit and a main body unit, the ADF unit including a driving motor disposed within a range corresponding to a width of a feeding path in a second direction perpendicular to a first direction, at an outer side relative to a curved part in the first direction, the main body unit including an accommodation unit configured to accommodate a recording sheet with long sides thereof along the first direction.

17 Claims, 9 Drawing Sheets

(56) References Cited

FOREIGN PATENT DOCUMENTS

| JP | 2004009664 A | 1/2004 |
| JP | 2004133151 A | 4/2004 |
| JP | 2007-074644 A | 3/2007 |
| JP | 2007-268864 A | 10/2007 |
| JP | 2009-044605 A | 2/2009 |
| JP | 2009044605 A | 2/2009 |
| JP | 2009-139971 A | 6/2009 |
| JP | 4612172 B2 | 1/2011 |

OTHER PUBLICATIONS

Feb. 17, 2015—(JP) Notification of Reasons for Rejection—App 2011-197178.

\* cited by examiner

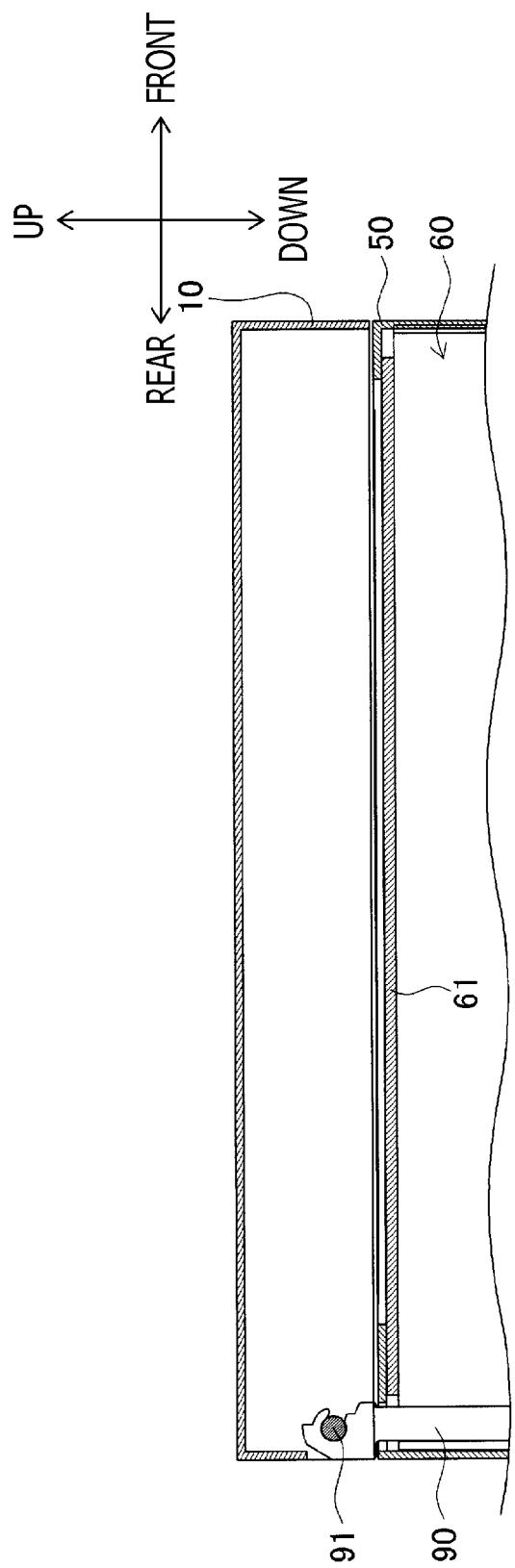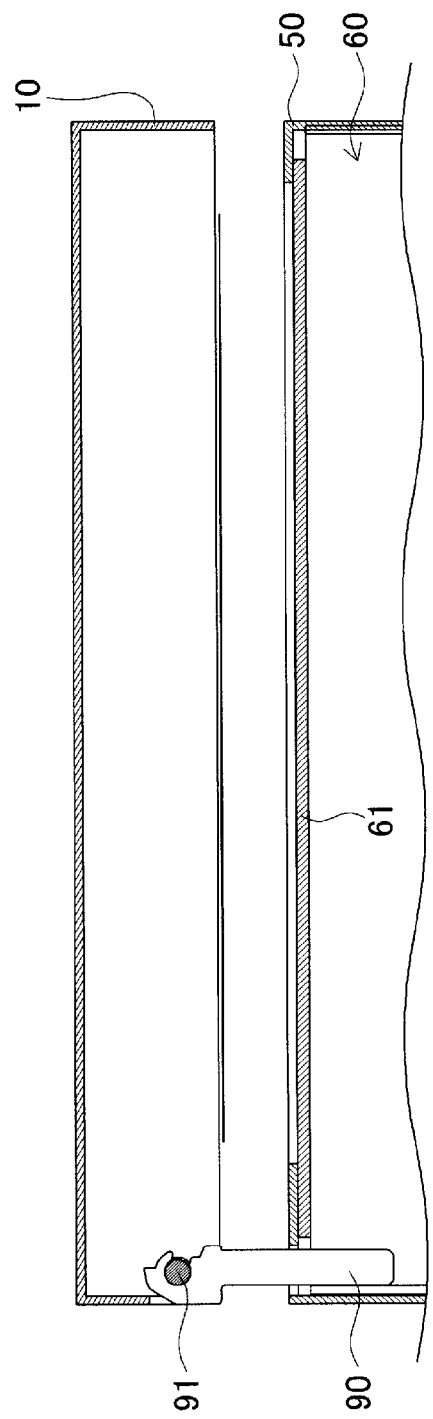

MULTIFUNCTION PERIPHERAL

CROSS-REFERENCE TO RELATED APPLICATION

This application claims priority under 35 U.S.C. §119 from Japanese Patent Application No. 2011-196751 filed on Sep. 9, 2011. The entire subject matter of the application is incorporated herein by reference.

BACKGROUND

1. Technical Field

The following description relates to one or more techniques for a multifunction peripheral (MFP) having a plurality of functions such as a scanning function and a printing function, particularly for an MFP that includes a main body unit containing an image forming unit and an automatic document feeder (ADF) unit disposed above the main body unit.

2. Related Art

A conventional MFP includes a main body unit containing an image forming unit, and an ADF unit disposed above the main body unit to achieve various functions such as a printing function and a scanning function. In the MFP, the ADF unit is configured to sequentially feed rectangular document sheets along a predetermined feeding path in order to read images of the document sheets by a reading unit. Further, the image forming unit is configured to feed rectangular recording sheets and form images on the recording sheets.

Moreover, as an example of the conventional MFP, an MFP has been known that includes a main body and a document pressing cover provided to be openable and closeable relative to an upper face of the main body. The main body includes an image forming unit and a reading unit. The document pressing cover includes an ADF unit.

SUMMARY

In the known MFP, the ADF unit is configured to be driven by a driving motor to feed rectangular document sheets on a feeding path extending along a left-to-right direction, which is defined under an assumption that a front side is a side where the MFP has an operation panel. Along the feeding path, the document sheets are fed with short sides thereof as an upstream end (a trailing end) and a downstream end (a leading end) in a feeding direction.

In the known MFP, the driving motor is disposed posterior to the feeding path of the ADF unit (i.e., disposed at a rear side of the MFP) and configured to transmit a driving force to a feed member (such as a feed roller) for feeding the document sheets. Thus, since the driving motor is disposed posterior to the feeding path of the ADF unit, it is hard to downsize the MFP in a front-to-rear direction.

Further, in the known MFP, the image forming unit disposed in the main body is configured to feed recording sheets placed in a feed cassette (which is inserted from a front side of the main body and attached to the inside of the main body) and form images on the recording sheets. In the feed cassette, each rectangular recording sheet is placed with short sides thereof along the left-to-right direction of the MFP (i.e., in a state where long sides (a longitudinal direction) of the recording sheet extend along the front-to-rear direction). In image formation on the recording sheets, each recording sheet is fed with a short side thereof as a leading end, along the front-to-rear direction of the MFP. Accordingly, in the image forming unit as well, each recording sheet is accommodated with the long sides thereof along the front-to-rear direction of the MFP. Thus, it is hard to downsize the MFP in the front-to-rear direction.

Aspects of the present invention are advantageous to provide one or more improved techniques for an MFP that includes a main body unit containing an image forming unit and an ADF unit disposed above the main body unit, the techniques making it possible to downsize the MFP.

According to aspects of the invention, a multifunction peripheral is provided, which includes an ADF unit configured to feed a rectangular document sheet to be read, and a main body unit, the ADF unit including a feeding path having a width corresponding to a short side of the document sheet and extending along a first direction, the feeding path comprising a curved part provided at an end portion in the first direction to turn a document feeding direction of the document sheet, a feeding unit configured to feed, along the feeding path, the document sheet with long sides thereof along the first direction, and a driving motor disposed within a range corresponding to the width of the feeding path in a second direction perpendicular to the first direction, at an outer side relative to the curved part in the first direction, the driving motor being configured to provide a driving force to the feeding unit, the main body unit including a reading unit configured to read an image of the document sheet fed by the ADF unit, an accommodation unit configured to accommodate a recording sheet with long sides thereof along the first direction, and an image forming unit configured to feed, from the accommodation unit, a recording sheet in a predetermined sheet feeding direction and form an image on the recording sheet.

BRIEF DESCRIPTION OF THE ACCOMPANYING DRAWINGS

FIGS. 7A and 7B are cross-sectional side views showing a configuration of a hinge member in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, a multifunction peripheral (MFP) 1, which includes an automatic document feeder (ADF) unit 15 and an image forming unit 70, in an embodiment according to aspects of the present invention will be described with reference to the accompanying drawings.

The following description will be provided with an up-to-down direction (the vertical direction), a front-to-rear direction, and a left-to-right direction defined as shown the accompanying drawings.

Figure 1:
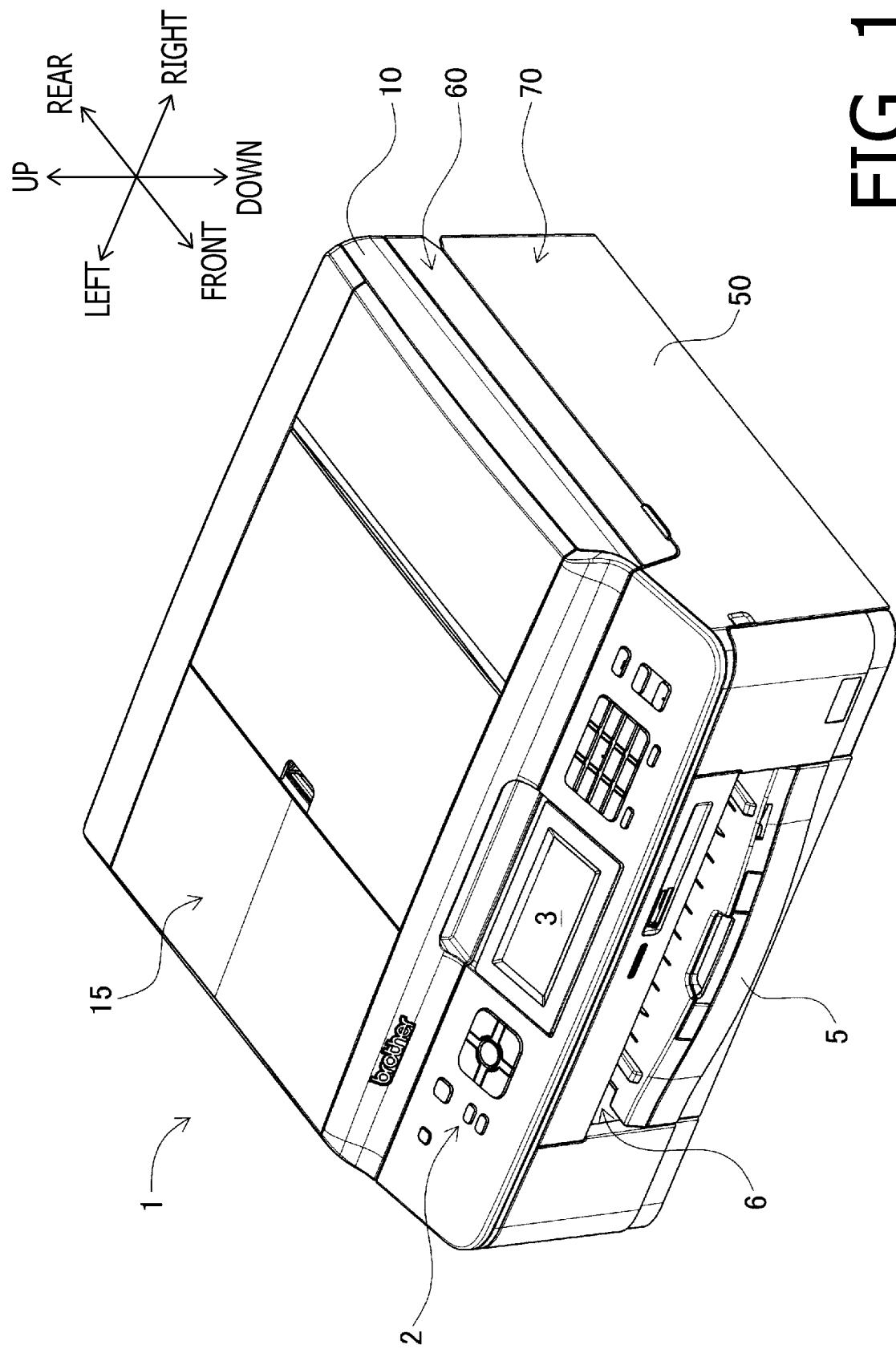
FIG. 1 is a perspective view showing a multifunction peripheral (MFP) in an embodiment according to one or more aspects of the present invention.

As shown in FIG. 1, the MFP 1 includes an upper cover 10 and a main body housing 50. The upper cover 10 is provided to turn around a rear end of an upper face of the main body housing 50 in a manner openable and closeable relative to the main body housing 50. The upper cover 10 includes the ADF unit 15 disposed at a left portion thereof. The ADF unit 15 is configured to feed a document sheet S along a predetermined document feeding path 25 to read an image of the document sheet S. A configuration of the ADF unit 15 will be described in detail later with reference to the relevant drawings.

The main body housing 50 is configured to accommodate various kinds of components for achieving various functions (such as a scanning function, a facsimile function, and a printing function) of the MFP 1. Specifically, the main body housing 50 includes a scanning unit 60 disposed at an upper portion thereof, and the image forming unit 70 disposed at a lower portion thereof. The scanning unit 60 is configured to read the image of the document sheet S. The image forming unit 70 is configured to form an image on a recording sheet P based on externally input image data. The scanning unit 60 and the image forming unit 70 will be described in detail later with reference to the relevant drawings.

Figure 2:
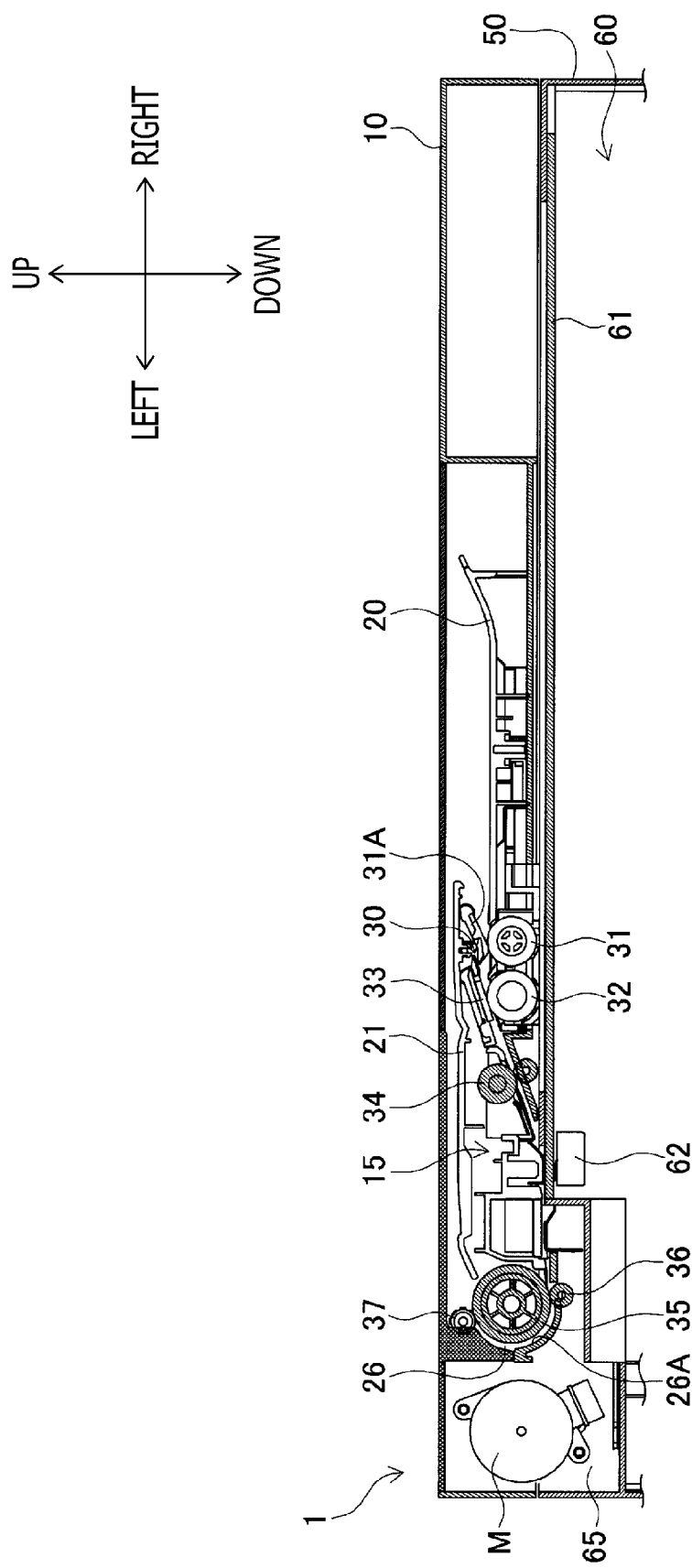
FIG. 2 is a cross-sectional front view showing configurations of an upper cover and a scanning unit of the MFP in the embodiment according to one or more aspects of the present invention.
Figure 3:
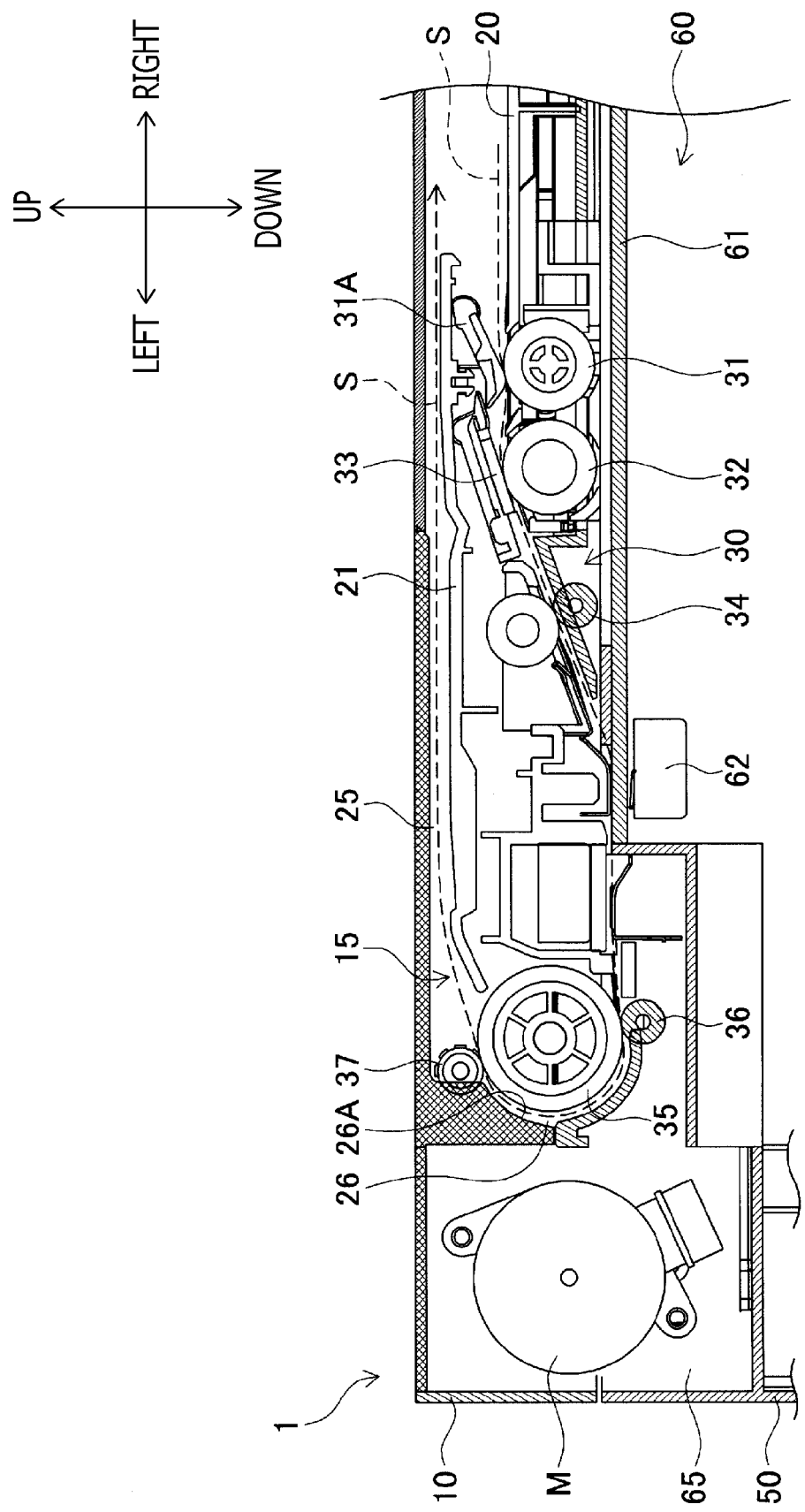
FIG. 3 is a cross-sectional front view showing a configuration of an ADF unit provided in the upper cover in the embodiment according to one or more aspects of the present invention.

The upper cover 10 is provided to turn in an openable and closeable manner around the rear end of the upper face of the main body housing 50. As shown in FIGS. 1 to 3, the upper cover 10 is configured to cover the upper face of the main body housing 50 (i.e., the upper face of the scanning unit 60) when the upper cover 10 is closed. Accordingly, when closed, the upper cover 10 holds the document sheet S (to be read by the scanning unit 60) placed on a below-mentioned contact glass 61.

The main body housing 50 accommodates a controller for controlling the MFP 1. The controller includes a CPU, a ROM, and a RAM. The controller controls the ADF unit 15, the scanning unit 60, and the image forming unit 70 to achieve the various functions such as the scanning function, the facsimile function, and the printing function.

Further, the main body housing 50 includes an operation panel 2 having a plurality of operable portions, and a liquid crystal display (LCD) 3 configured to display various kinds of information. The operation panel 2 and the LCD 3 are disposed at a front side of the upper face of the main body housing 50. The operation panel 2 is connected with the controller and configured to accept various instructions to the MFP 1 input therethrough. Accordingly, the controller performs user-intended control responsive to a user's input operation of the operation panel 2. In addition, the LCD 3 is connected with the controller. Thus, the controller controls the LCD 3 to display thereon various kinds of information responsive to a user's input operation of the operation panel 2 or arithmetic processing results.

At the front face of the main body housing 50, there is a space formed of which a front side is opened. A feed cassette 5 is detachably attached into the space. The feed cassette 5 is configured to accommodate a stack of rectangular recording sheets P to be used for an image forming operation by the image forming unit 70. In the feed cassette 5, the recoding sheets P are placed with long sides (a longitudinal direction) thereof along the left-to-right direction of the MFP 1 (see FIG. 8). When the feed cassette 5 is attached into the space, an ejected sheet receiving space 6 is formed above the feed cassette 5. The ejected sheet receiving space 6 is a space into which recording sheet P having images formed thereon by the image forming unit 70 are ejected. The recording sheets P having the images formed thereon are sequentially ejected to be stacked on an upper surface of the feed cassette 5.

Subsequently, a detailed explanation will be provided about a configuration of the ADF unit 15 of the MFP 1 with reference to the relevant drawings. As shown in FIGS. 2 to 5, the ADF unit 15 includes a document setting portion 20, the document feeding path 25, a document feeding mechanism 30, a driving motor M, and a transmission mechanism 40. The ADF unit 15 is configured to feed document sheets S placed on the document setting portion 20, along the document feeding path 25 (see FIG. 3).

The document setting portion 20 is a substantially flat table formed at a portion of the upper cover 10 that is central in the left-to-right direction and middle in the vertical direction. The document setting portion 20 is configured such that the document sheets S to be fed by the ADF unit 15 are placed with long sides (a longitudinal direction) thereof along the left-to-right direction of the MFP 1 (i.e., in a state where short sides of the document sheets S are parallel to the front-to-rear direction of the MFP 1). The document setting portion 20 is formed along one end of the document feeding path 25.

There is a partition plate 21 formed in a position higher than and a predetermined distance away from the document setting portion 20. The partition plate 21 serves as a partition covering an upper side of the document feeding mechanism 30 inside the ADF unit 15. Further, the partition plate 21 is formed along the other end of the document feeding path 25. Moreover, the partition plate 21 has an upper surface on which the document sheets S fed by the ADF unit 15 are stacked.

The document feeding path 25 is formed, inside the ADF unit 15, to extend along the left-to-right direction of the MFP 1 from the document setting portion 20 so as to be continuous with the surface of the partition plate 21. Further, the document feeding path 25 has a U-turn path 26. Moreover, the document feeding path 25 has a width (a dimension in the front-to-rear direction of the MFP 1) corresponding to the short sides of the document sheets S. As described above, on the document setting portion 20, the document sheets S are placed with the long sides (the longitudinal direction) thereof along the left-to-right direction of the MFP 1. Further, the document sheets S are fed along the document feeding path 25 extending along the left-to-right direction of the MFP 1. Accordingly, the document sheets S are fed on and along the document feeding path 25 in a state where the short sides thereof are along the front-to-rear direction of the MFP 1.

At a left portion of the ADF unit 15, the U-turn path 26 is formed substantially in a "U" shape when viewed along the front-to-rear direction of the MFP 1. The U-turn path 26 is configured to turn a feeding direction of a document sheet S fed leftward from the document setting portion 20 by 180 degrees and guide the document sheet S onto the surface of the partition plate 21 (see FIG. 3). Thus, the U-turn path 26 is disposed at a left side of the document feeding path 25 (at a left side relative to a below-mentioned contact glass 61) in the upper cover 10.

In the embodiment, the feeding direction of the document sheets S is defined as a course on which the document sheets S are fed from the surface of the document setting portion 20 to the partition plate 21 along the document feeding path 25. The width of the document feeding path 25 corresponds to the short sides of the document sheets S, and is substantially as long as or slightly longer than the length of the short sides of the document sheets S so as to enable smooth feeding of the document sheets S.

Figure 4:
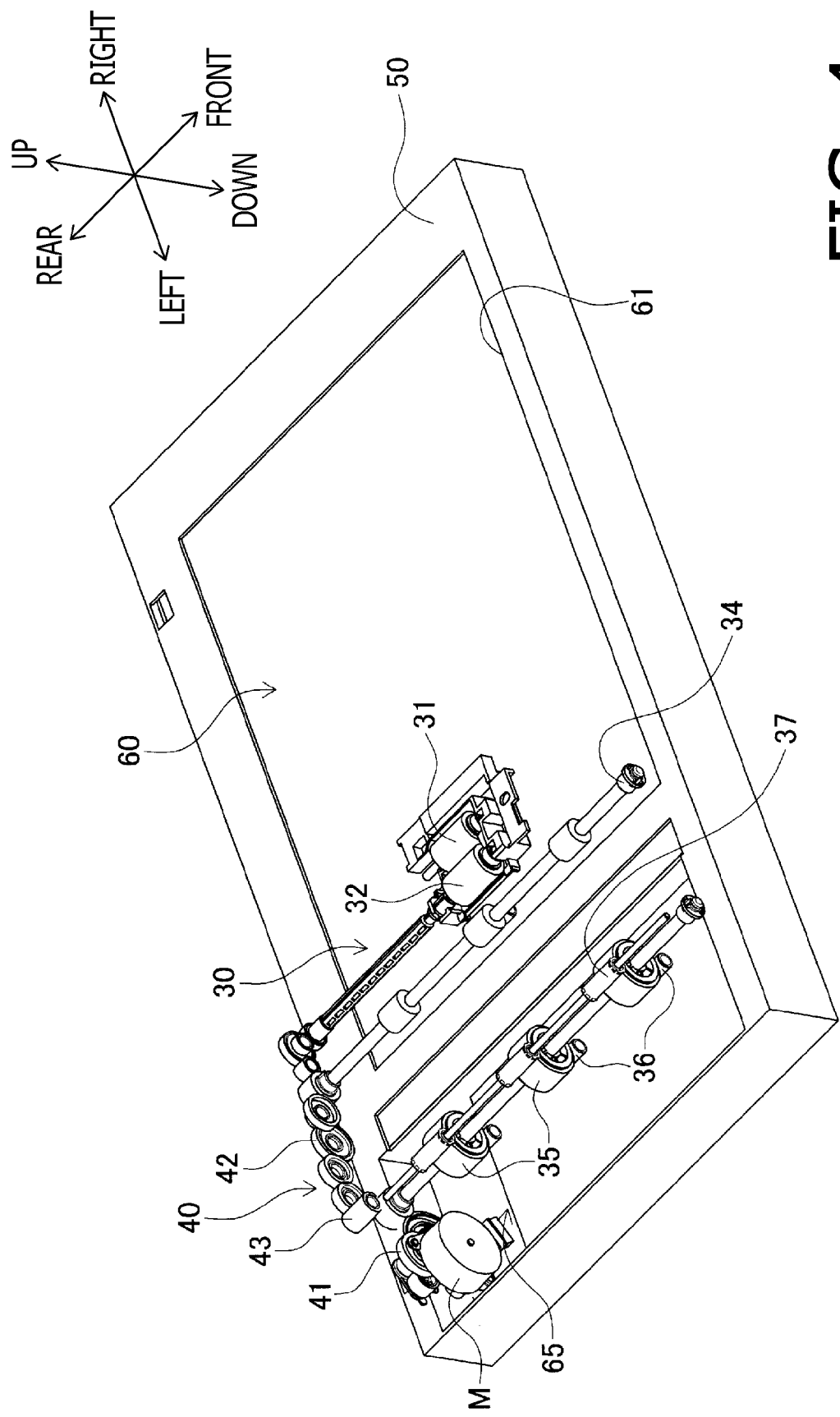
FIG. 4 is a perspective view showing configurations of a driving motor, a document feeding mechanism, and a transmission mechanism of the MFP in the embodiment according to one or more aspects of the present invention.

As shown in FIGS. 3 and 4, the document feeding mechanism 30 is configured to feed the document sheets S placed on the document setting portion 20 toward a downstream side on the document feeding path in the feeding direction, by a driving force transmitted from the driving motor M through the document feeding mechanism 30.

The document feeding mechanism 30 includes a document pickup roller 31, a document contact member 31A, a document separation roller 32, a separation pad 33, document feed rollers 34, a main roller 35, a first driven roller 36, and a second driven roller 37. The document pickup roller 31 is rotatably supported to be along a downward-facing side of a document sheet S being fed on the document feeding path 25, at a downstream side relative to the document setting portion 20 in the feeding direction. When driven by the driving motor M, the document pickup roller 31 is rotated to feed the document sheets S placed on the document setting portion 20 downstream in the feeding direction.

The document contact member 31A is swingably provided in such a position as to face the document pickup roller 31 across the document feeding path 25 and contact an upward-facing side of a document sheet S lying on the document pickup roller 31. The document contact member 31A is configured to press the document sheet S placed on the document setting portion 20 against the document pickup roller 31. Further, the document contact member 31A has a function to manage the document sheet S to be smoothly separated from other sheets S.

The document separation roller 32 is rotatably supported to be along the downward-facing side of the document sheet S being fed on the document feeding path 25, at a downstream side relative to the document pickup roller 31 in the feeding direction. When driven by the driving motor M, the document separation roller 32 is rotated to separate a single document sheet S from other sheets S in collaboration with the separation pad 33 and feed the separated document sheet S downstream in the feeding direction.

Between the document separation roller 32 and the document pickup roller 31, there is a mechanism provided to transmit to the document pickup roller 31 the driving force transmitted to the document separation roller 32. Accordingly, the driving force from the driving motor M is transmitted to the document pickup roller 31 via the document separation roller 32 and the mechanism.

The separation pad 33 is a thin plate member made of material having a predetermined level of flexibility and a predetermined degree of frictional resistance. The separation pad 33 is disposed in such a position as to face the document separation roller 32 across the document feeding path 25 at a downstream side relative to the document contact member 31A in the feeding direction. The separation pad 33 is disposed to contact an upward-facing side of a document sheet S lying on the document separation roller 32. The separation pad 33 is configured to apply a frictional force to a document sheet S and separate the document sheet S from other sheets S on a sheet-by-sheet basis in collaboration with the document separation roller 32.

The document feed rollers 34 are rotatably supported in such respective positions as to face each other across the document feeding path 25 at a downstream side relative the document separation roller 32 and the separation pad 33 in the feeding direction. One of the document feed rollers 34 disposed at an upper portion of the document feeding path 25 is driven to rotate by the driving force from the driving motor M. The other of the document feed rollers 34 disposed at a lower portion of the document feeding path 25 is driven by rotation of the opposed roller 34. The document feed rollers 34 are configured to feed the document sheet S (separated by the document separation roller 32 and the separation pad 33 from other sheets S on a sheet-by-sheet basis) downstream in the feeding direction along the document feeding path 25 by rotating while pinching the separated document sheet S therebetween.

The main roller 35 is rotatably supported in such a position as to be along the U-turn path 26 that forms the document feeding path 25. The main roller 35 is driven to rotate by the driving motor M. Further, an outer circumferential surface of the main roller 35 forms a part of the U-turn path 26 together with a guide surface 26A opposed to the main roller 35. In response to rotation of the main roller 35, the document sheet S fed by the document feeding rollers 34 is conveyed along the U-turn path 26.

The first driven roller 36 is rotatably supported in such a position as to face the main roller 35 across the document feeding path 25 (the U-turn path 26) under the main roller 35. The first driven roller 36 is driven by rotation of the main roller 35. Further, the second driven roller 37 is rotatably supported in such a position as to face the main roller 35 across the document feeding path 25 (the U-turn path 26) above the main roller 35. The second driven roller 37 is driven by rotation of the main roller 35. Accordingly, the document sheet S is conveyed along the U-turn path 26 by rotation of the main roller 35 and the first and second driven rollers 36 and 37.

The driving motor M is a driving source for feeding of the document sheet S by the ADF unit 15. The driving motor M is driven in accordance with control by the controller. As shown in FIGS. 2 to 4, and 6, the driving motor M is disposed to partially protrude into the side of the main body housing 50. Thus, the MFP 1 is allowed to have a smaller thickness of the upper cover 10 (the dimension of the upper cover 10 in the vertical direction) than when the driving motor M is entirely housed in the upper cover 10 (the ADF unit 15).

As shown in FIGS. 2 to 6, and 8, the driving motor M is disposed at a left side relative to the U-turn path 26 (disposed at a leftmost side on the document feeding path 25) across the guide surface 26A in the left-to-right direction of the MFP 1. The driving motor M is disposed at a rear portion of the MFP 1 within a range corresponding to the width of the document feeding path 25 in the front-to-rear direction of the MFP 1 (see FIGS. 4 and 5). Accordingly, the MFP 1 is allowed to have a smaller size of the upper cover 10 in the front-to-rear direction in comparison with a known configuration that the driving motor M is disposed behind the document feeding path 25. Further, in this case, even when the upper cover 10 is downsized in the front-to-rear direction, it does not exert an undesired influence on feeding of the document sheet S on the document feeding path 25 since the driving motor M is disposed at a left side relative to the U-turn path 26.

The transmission mechanism 40 is configured to transmit the driving force from the driving motor M to the document feeding mechanism 30. The transmission mechanism 40 includes a first gear train 41, a second gear train 42, and a transmission gear 43 (see FIGS. 4 and 5). The first gear train 41 is connected with a driving shaft that extends from the driving motor M toward the rear side of the upper cover 10. The first gear train 41 includes a plurality of gears arranged in a row along the left-to-right direction of the MFP 1. The first gear train 41, which includes a gear attached to a rotational shaft of the main roller 35, transmits the driving force from the driving motor M to the main roller 35.

Figure 5:
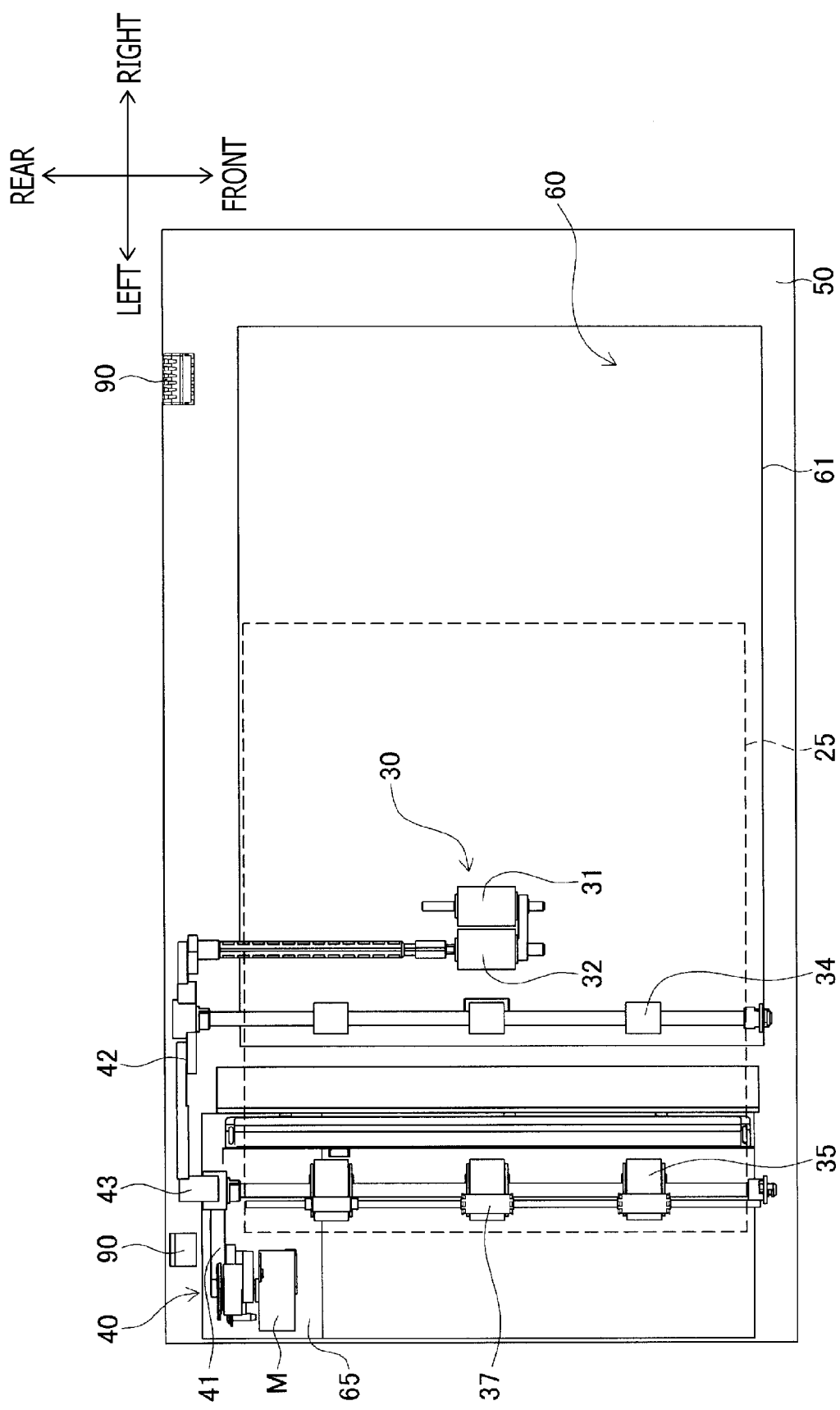
FIG. 5 is a top view showing a layout of the driving motor, the document feeding mechanism, and the transmission mechanism of the MFP in the embodiment according to one or more aspects of the present invention.
Figure 6:
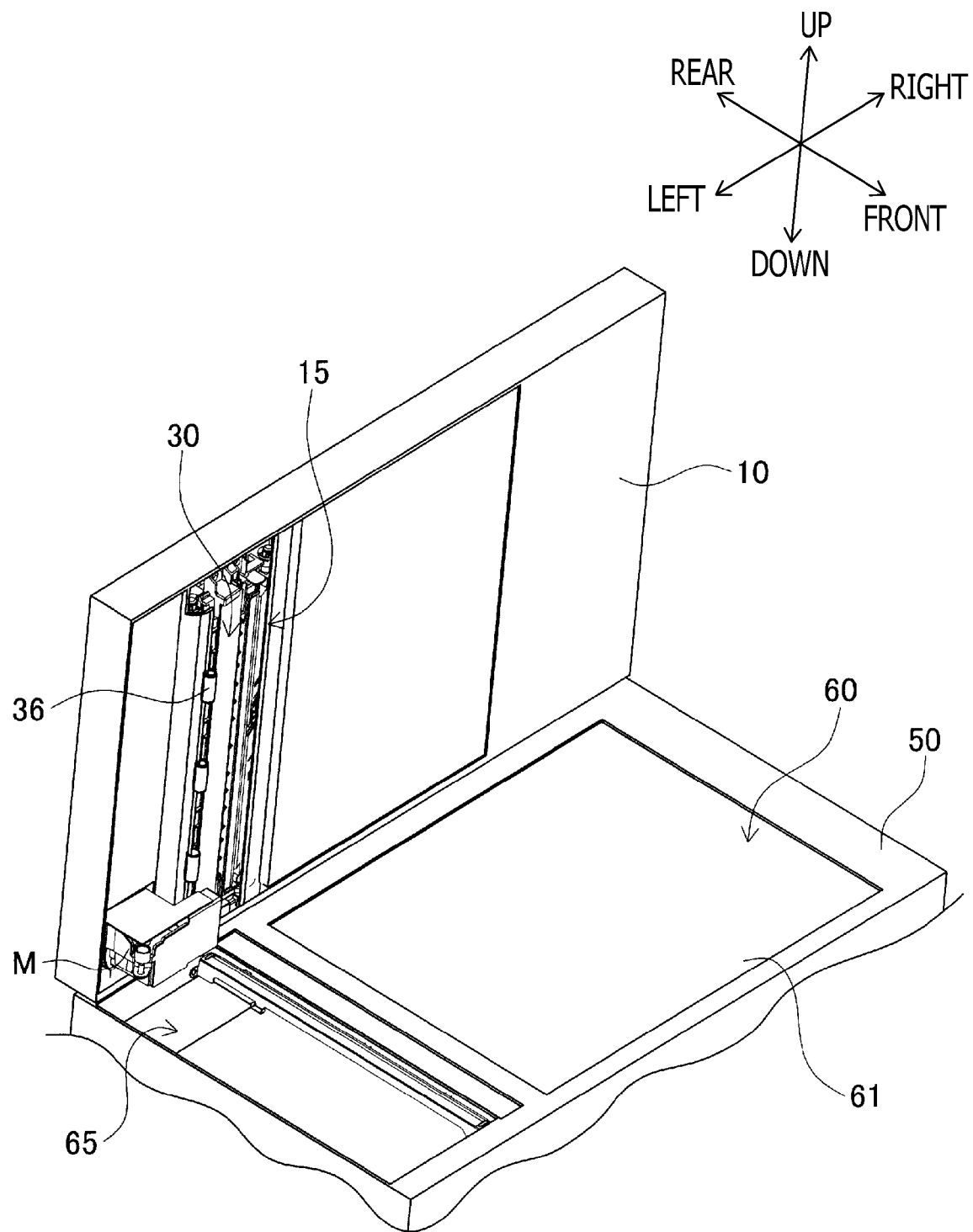
FIG. 6 illustrates a state where the upper cover is in an open position in the embodiment according to one or more aspects of the present invention.

The second gear train 42, which includes a plurality of gears arranged in a row along the left-to-right direction of the MFP 1, is disposed along a rear side surface of the document feeding path 25 (see FIGS. 4 and 5). Namely, the second gear train 42 is provided to extend in the left-to-right direction, in a position behind and a predetermined distance away from the first gear train 41 in the front-to-rear direction of the MFP 1. The second gear train 42 includes a gear attached to a rotational shaft (of the upper one) of the document feed rollers 34, and a rotational shaft of the document separation roller 32. Thereby, the second gear train 42 transmits the driving force from the driving motor M to the document feed rollers 34 and the document separation roller 32.

The transmission gear 43 has a thickness corresponding to a distance between the first gear train 41 and the second gear train 42 in the front-to-rear direction of the MFP 1. The transmission gear 43 is rotatably supported in such a position as to contact both a rightmost gear of the first gear train 41 and a leftmost gear of the second gear train 42. Thereby, the driving force from the driving motor M is transmitted to the second gear train 42 via the first gear train 41 and the transmission gear 43.

Namely, even when the driving motor M is disposed within a range corresponding to the width of the document feeding path 25 in the front-to-rear direction of the MFP 1, at a left side relative to the U-turn path 26 in the left-to-right direction of the MFP 1, the MFP 1 is allowed to transmit the driving force from the driving motor M to the document feeding mechanism 30 by utilizing a limited space to avoid an enlarged size of the upper cover 10 in the front-to-rear direction.

Subsequently, a detailed explanation will be provided about a configuration of the main body housing 50 with reference to the relevant drawings. As shown in FIG. 1, the main body housing 50 includes the scanning unit 60 disposed at an upper portion thereof and the image forming unit 70 disposed under the scanning unit 60. The scanning unit 60 includes the contact glass 61 that serves as a document setting table, an image sensor 62, a slide shaft, and a motor (see FIG. 2). The contact glass 61 is a so-called "platen glass" and formed in a rectangular shape having a size slightly larger than the A4 size and long sides (a longitudinal direction) along the left-to-right direction of the main body housing 50.

The image sensor 62 is provided with a contact image sensor (CIS) and configured to read an image of the document sheet S placed on the contact glass 61. The image sensor 62 has a reading range corresponding to the short-side length of the A4 size in a main scanning direction (i.e., in the front-to-rear direction of the main body housing 50). The image sensor 62 is held by the slide shaft extending in the left-to-right direction of the main body housing 50, to be movable in a sliding manner within a predetermined range (e.g., a range corresponding to the long-side length of the A4 size) in the left-to-right direction. Thus, the MFP 1 is allowed to read the image of the document sheet S placed on the contact glass 61 while moving the image sensor 62 in a sliding manner along the slide shaft under the controller's control of the motor of the scanning unit 60.

On the upper face of the main body housing 50, there is a recessed portion 65 formed in a downward-recessed shape at a portion corresponding to the position where the driving motor M is provided in the upper cover 10 (see FIGS. 2 to 6). The recessed portion 65 is configured to accommodate a part of the driving motor M that protrudes downward out of the upper cover 10 in the state where the upper cover 10 is closed. Thus, owing to the above configuration regarding the recessed portion 65 and the position of the driving motor M in the upper cover 10, it is possible to downsize the MFP 1 in the vertical direction.

There is a hinge member 90 provided to two positions at a rear end of the upper face of the main body housing 50. The hinge member 90 supports (includes) a rotational shaft 91 to be rotatable that is disposed at a rear end of the upper cover 10 (see FIGS. 5, 7A, and 7B). Namely, the hinge member 90 supports the upper cover 10 via the rotational shaft 91 to be openable and closeable relative to the upper face of the main body housing 50 (see FIGS. 1 to 6). As shown in FIGS. 7A and 7B, the hinge member 90 is movable along a rear end of the contact glass 61 in the vertical direction. Even when being at a lowermost level, the hinge member 90 keeps the rotational shaft 91 higher than the upper face of the main body housing 50 (i.e., than the upper surface of the contact glass 61) (see FIG. 7A). Thereby, even though the hinge member 90 is provided to the positions along the rear end of the contact glass 61, it is possible to downsize the MFP 1 in the front-to-rear direction without exerting an undesired influence on an opening-closing operation of the upper cover 10.

As shown in FIG. 5, a left-side portion of the hinge member 90 is disposed at a corner behind the driving motor M and the first gear train 41. Namely, in the MFP 1, the corner which is a vacant space is efficiently utilized for (the left-side portion of) the hinge member 90, and thus it is possible to downsize the MFP 1 in the front-to-rear direction.

Subsequently, a configuration of the image forming unit 70 will be described with reference to the relevant drawings. The image forming unit 70 is configured to, while feeding the recording sheets P placed in the feed cassette 5 along the front-to-rear direction of the MFP 1, form images on the recording sheets P. The image forming unit 70 includes a recording unit 75, a sheet feeding path 80, and a sheet feeding unit 85. As described above, in the feed cassette 5, the recording sheets P are placed with the long sides (the longitudinal direction) thereof along the left-to-right direction of the MFP 1. The recording sheets P are fed, by the sheet feeding unit 85, on the sheet feeding path 80 extending along the front-to-rear direction of the MFP 1. Thus, when image formation is carried out by the image forming unit 70, each recording sheet P is fed with one of the long sides thereof as a leading end.

Figure 9:
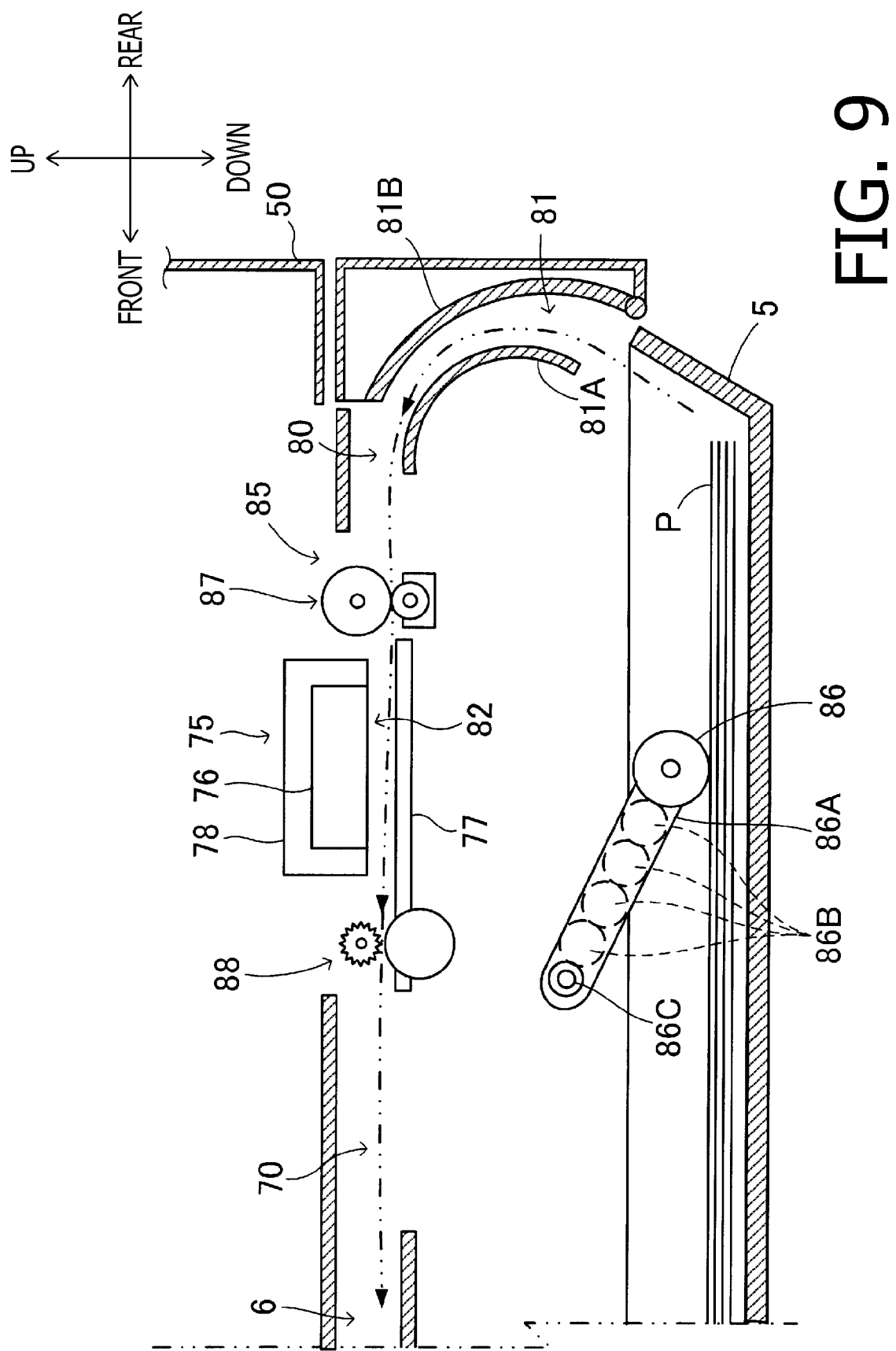
FIG. 9 is a cross-sectional side view showing a configuration of an image forming unit of the MFP in the embodiment according to one or more aspects of the present invention.

As shown in FIG. 9, the recording unit 75 includes a recording head 76, a platen disposed under the recording head 76, a carriage 78 for holding the recording head 76, a rail (not shown) configured to support the carriage 78 and the recording head 76 held by the carriage 78 in a manner slidable in the left-to-right direction, and a driving unit (not shown) including a driving force transmission mechanism configured to transmit a driving force to the carriage 78. Thus, the recording unit 75 is configured to form an image on the recording sheet P being fed along the sheet feeding path 80.

The recording head 76 includes a nozzle having a discharge outlet. The recording head 76 is configured to deform the nozzle by a piezoelectric element to discharge an ink droplet from the nozzle downward to the platen 77, in accordance with control by the controller. By controlling the recording head 76 to discharge the ink while reciprocating the recording head 76 in the left-to-right direction during a process of the recording sheet P being fed forward on the platen 77, the MFP 1 is allowed to form an image on a substantially entire surface area of the recording sheet P.

The sheet feeding path 80 is formed along the front-to-rear direction of the MFP 1 inside the image forming unit 70. The sheet feeding path 80 includes a first feeding path 81 and a second feeding path 82 (see FIG. 9). The first feeding path 81 includes an inner guide member 81A and an outer guide member 81B that are formed in respective arc shapes and face each other in a radial direction thereof. Further, the first feeding path 81 is formed with an arc-shaped (curved) cross-section that extends from one end located above a rear end of the fed cassette 5 upward to the other end located behind the platen 77.

The second feeding path 82 is formed with a linear cross-section extending from a downstream end of the first feeding path 81 in a feeding direction of the recording sheet P toward the ejected sheet receiving space 6 via a pathway between the recording head 76 and the platen 77. An upper surface of the platen forms a part of a lower guide surface of the second feeding path 82. Therefore, the recording sheet P fed out of the feed cassette 5 reaches the recording unit 75 along the first and second feeding paths 81 and 82, passes through the second feeding path 82, and then is ejected into the ejected sheet receiving space 6.

The sheet feeding unit 85 includes a sheet pickup roller 86, sheet feed rollers 87, and sheet ejection rollers 88. The sheet feeding unit 85 is configured to feed the recording sheets P placed in the feed cassette 5 along the sheet feeding path 80 extending in the front-to-rear direction of the MFP 1.

The sheet pickup roller 86 includes an arm 86A, a gear train 86B, and a supporting shaft 86C. The sheet pickup roller 86 is configured to feed the recording sheet P placed in the feed cassette 5 onto the sheet feeding path 80. The sheet pickup roller 86 is rotatably supported at a distal end of the arm 86A turning around the supporting shaft 86C, above a rear portion of the feed cassette 5. When a driving force is transmitted to the supporting shaft 86C, the sheet pickup roller 86 is rotated by the driving force transmitted via the gear train 86B disposed inside the arm 86A. The sheet pickup roller 86 is configured to rotate in contact with the recording sheet P and feed the recording sheet P onto the sheet feeding path 80.

The sheet feed rollers 87 are rotatably supported in such respective positions as to face each other across the second feeding path 82, behind the recording unit 75 (i.e., at an upstream side relative to the recording unit 75 in the feeding direction). The sheet feed rollers 87 are configured to rotate while pinching therebetween the recording sheet P being fed on the second feeding path 82 and thereby feed the recording sheet P to the recording unit 75.

The sheet ejection rollers 88 are rotatably supported in such respective positions as to face each other across the second feeding path 82, ahead of the recording unit 75 (i.e., at a downstream side relative to the recording unit 75 in the feeding direction). The sheet ejection rollers 88 are configured to rotate while pinching therebetween the recording sheet P with an image formed thereon by the recording unit 75 and thereby eject the recording sheet P into the ejected sheet receiving space 6.

As described above, the recording sheet P is placed in the feed cassette 5 in the state where the short sides thereof along the front-to-rear direction of the MFP 1. The feeding path 80 is formed with an arc-shaped (curved) cross-section that extends from the rear portion of the feed cassette 5 upward to behind the platen 77 and further linearly extends from an end of the arc shape toward a front side of the MFP 1. Namely, in the MFP 1, the sheet feeding path 80 is formed to be substantially as long as the short sides of the recording sheet P. Thereby, it is possible to downsize the MFP 1 in the front-to-rear direction of the main body housing 50 in comparison with such a configuration that the feed cassette 5 accommodates the recording sheet P with the long sides thereof along the front-to-rear direction of the MFP 1.

Figure 8:
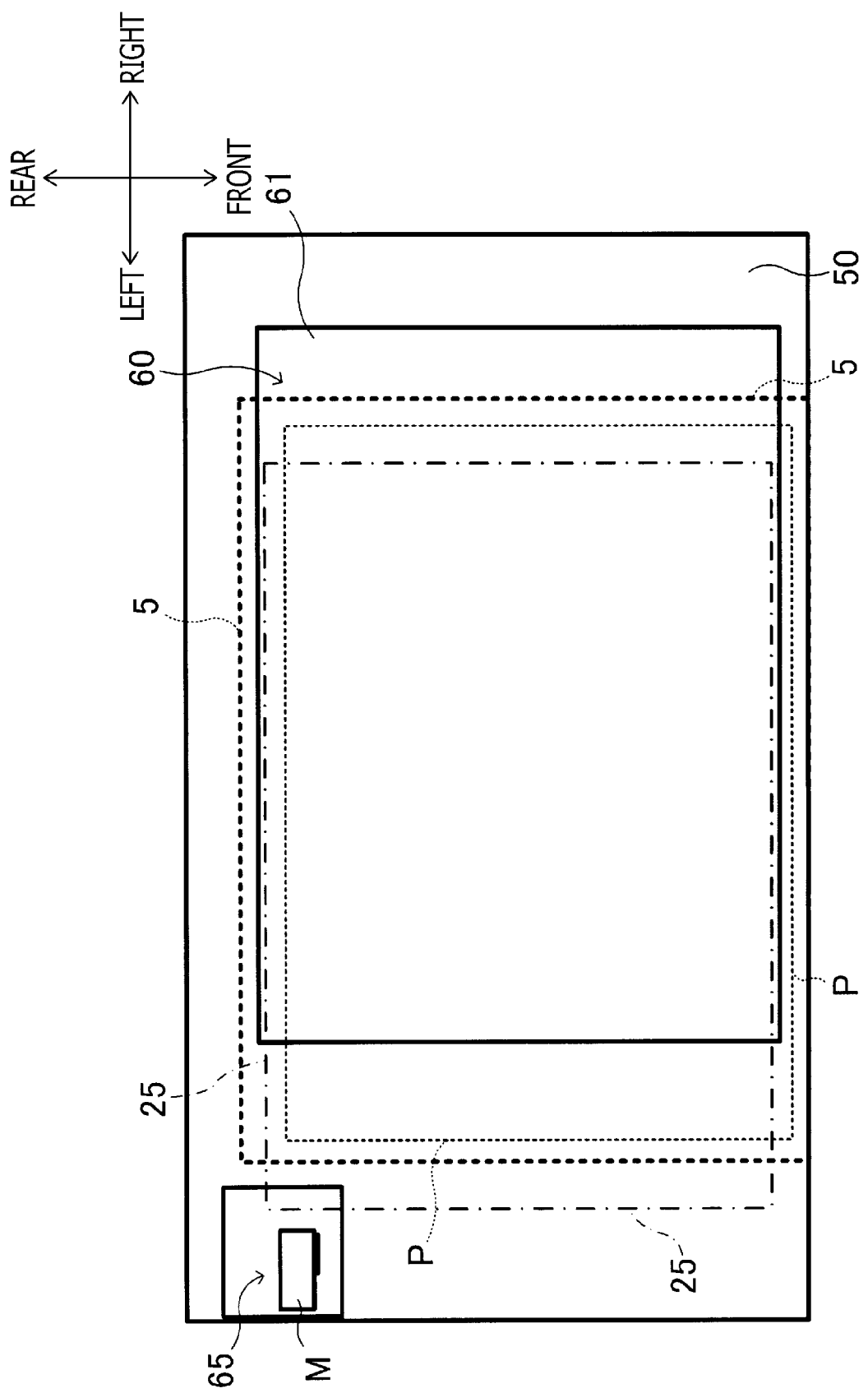
FIG. 8 is a top view showing a layout of the driving motor, a feeding path, and a recording sheet placed in a feed cassette in the embodiment according to one or more aspects of the present invention.

As shown in FIG. 8, in the ADF unit 15, the document sheet S is placed on the document setting portion 20 in a state where the short sides of the document sheet S are along the front-to-rear direction of the MFP 1. Further, in the main body housing 50, the recording sheet P is placed in the feed cassette 5 in a state where the short sides of the recording sheet P are along the front-to-rear direction of the MFP 1. Hence, it is possible to downsize any of the ADF unit 15 and the main body housing 50 in the front-to-rear direction of the MFP 1. Thus, it is possible to downsize the MFP 1 as a whole in the front-to-rear direction.

As described above, the MFP 1 of the embodiment includes the upper cover 10 that has the ADF unit 15, and the main body housing 50 that has the scanning unit 60 and the image forming unit 70. The ADF unit 15 includes the document feeding path 25, the document feeding mechanism 30, and the driving motor M. The ADF unit 15 is configured to feed the document sheet S along the document feeding path 25 so as to enable the scanning unit 60 to read an image of the document sheet S. The document feeding path 25 has a width corresponding to the length of the short sides of the document sheet S, and extends along the left-to-right direction of the MFP 1. The document feeding path 25 includes the U-turn path 26 for turning the feeding direction of the document sheet S. The U-turn path 26 is disposed at the left side in the upper cover 10 (at the left end of the document feeding path 25). The document feeding mechanism 30 is configured to feed the document sheet S on the document feeding mechanism 25 such that the long sides of the document sheet S are along the left-to-right direction of the MFP 1. The driving motor M is disposed within the range corresponding to the width of the document feeding path 25 in the front-to-rear direction of the MFP 1, at the left side relative to the U-turn path 26 in the left-to-right direction of the MFP 1. The driving motor M is configured to provide the driving force to the document feeding mechanism 30. Thus, it is possible to reduce the external dimension of the MPF 1 in the front-to-rear direction to be substantially as long as the width of the document feeding path 25 (see FIGS. 5 and 8). Further, the main body housing 50 includes the feed cassette 5 configured to accommodate the recording sheets P with the long sides thereof along the left-to-right direction of the MFP 1, and the image forming unit 70 configured to form images on the recording sheets P while feeding the recording sheets P. Since the feed cassette 5 is configured to accommodate the recording sheets P with the long sides thereof along the left-to-right direction, it is possible to reduce the external dimension of the MFP 1 in the front-to-rear direction.

The driving motor M is disposed to partially protrude downward from the lower surface of the upper cover 10 that includes the ADF unit 15 (see FIGS. 2 and 3). Further, the main body housing 50 has the contact glass 61, the scanning unit 60 including the image sensor 62, and the recessed portion 65 provided on the upper face thereof. The recessed portion 65 is formed at a portion, on the upper face of the main body housing 50, which corresponds to the position of the lower surface of the upper cover 10 where the driving motor M is disposed. The recessed portion 65 accommodates the part of the driving motor M that protrudes from the lower surface of the upper cover 10. Thus, since the recessed portion 65 formed on the upper face of the main body housing 50 is configured to accommodate the part of the driving motor M, it is possible to downsize the MFP 1 in the vertical direction.

Further, the image forming unit 70 feeds the recording sheets P, placed in the feed cassette 5 with their long sides along the left-to-right direction of the MFP 1, along the front-to-rear direction of the MFP 1 perpendicular to the feeding direction (the left-to-right direction) in which the ADF unit 15 feeds the document sheets S. Thereby, it is possible to reduce the length of the sheet feeding path 80 for the recording sheets P in the image forming unit 70 to be as long as the short sides of the recording sheets P. Thus, it is possible to downsize the MFP 1 in the front-to-rear direction.

The ADF unit 15 has the transmission mechanism 40 that includes the first gear train 41, the second gear train 42, and the transmission gear 43. The first gear train 41 extends in the left-to-right direction of the MFP 1 along the document feeding path 25. The first gear train 41 transmits the driving force from the driving motor M to the document feeding mechanism 30. The second gear train 42 is disposed in a different position from the first gear train 41 in the front-to-rear direction of the MFP 1, and extends along the left-to-right direction of the MFP 1 from the driving shaft of the driving motor M. The second gear train 42 transmits the driving force from the driving motor M. The transmission gear 43 has a thickness corresponding to the distance between the first gear train 41 and the second gear train 42 in the front-to-rear direction of the MFP 1. The transmission gear 43 contacts a gear disposed at an end of the first gear train 41 and a gear disposed at an end of the second gear train 42. Accordingly, the driving force from the driving motor M is transmitted to the document feeding mechanism 30 via the first gear train 41, the transmission gear 43, and the second gear train 42. Thus, even when the driving motor M is disposed within a range corresponding to the width of the document feeding path 25 in the front-to-rear direction of the MFP 1, at the left side relative to the U-turn path 26 in the left-to-right direction of the MFP 1, the MFP 1 is allowed to transmit the driving force from the driving motor M to the document feeding mechanism 30 by utilizing a limited space to avoid an enlarged size of the upper cover 10 in the front-to-rear direction (see FIGS. 4 and 5).

Further, the upper cover 10 is rotatably supported by the hinge member 90 to be openable and closeable between a closed position (see FIGS. 1 to 3) where the upper cover 10 covers the upper face of the main body housing 50 and an open position (see FIG. 6) where the upper face of the main body housing 50 is exposed. The left-side portion of the hinge member 90 is disposed at the corner of the upper face of the main body housing 50 where the driving motor M and the first gear train 41 are disposed to be adjacent to each other (see FIG. 5). Hence, according to the MFP 1, it is possible to efficiently utilize the corner of the upper face of the main body housing 50 where the driving motor M and the first gear train 41 are disposed to be adjacent to each other. Thus, it is possible to downsize (the external dimension of) the MFP 1 in the front-to-rear direction.

The hinge member 90 includes (supports) the rotational shaft 91 that supports the upper cover 10 to be openable and closeable. Further, the hinge member 90 is provided to be movable within a predetermined range along the rear end of the contact glass 61 in the vertical direction (see FIGS. 7A and 7B). Even when the hinge member 90 is at the lowermost level, the rotational shaft 91 is kept higher than the upper face of the main body housing 50 (see FIG. 7A). Thereby, even when the hinge member 90 is provided along the rear end of the contact glass 61, it is possible to downsize (the external dimension of) the MFP 1 in the front-to-rear direction without exerting an undesired influence on the turning motion of the upper cover 10. The embodiment has been described based on the assumption that the direction parallel to the short sides of the document sheet S corresponds to the main scanning direction of the image sensor 62 and the direction parallel to the long sides of the document sheet S corresponds to the sub scanning direction of the image sensor 62. However, when the document sheet S has a small size and the long sides of the small-size document sheet S are equal to or less than the length of the reading range of the image sensor 62 in the main scanning direction, image reading may be carried out for the small-size document sheet S being fed with the long sides thereof along the sub scanning direction.

Hereinabove, the embodiment according to aspects of the present invention has been described. The disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the disclosure can be practiced without reapportioning to the details specifically set forth. In other instances, well known processing structures have not been described in detail, in order not to unnecessarily obscure the disclosure.

Only an exemplary embodiment of the disclosure and but a few examples of their versatility are shown and described in the disclosure. It is to be understood that the disclosure is capable of use in various other combinations and environments and is capable of changes or modifications within the scope of the inventive concept as expressed herein. For example, the following modifications are possible.

MODIFICATIONS

The left-to-right direction and the front-to-rear direction of the MFP 1 in the aforementioned embodiment may be defined in an interchanged manner.

In the aforementioned embodiment, the image forming unit 70 is configured to form an image on the recording sheet P in an inkjet method to discharge ink droplets from the recording head 76. However, the image forming unit 70 may employ another image forming method using toner as far as the method is adapted to perform image formation while feeding the recording sheet P.

What is claimed is:
1. A multifunction peripheral comprising:
an ADF unit configured to feed a rectangular document sheet to be read, the ADF unit comprising:
a feeding path having a width corresponding to a short side of the document sheet and the feeding path extending along a first direction, the feeding path comprising a curved part provided at an end portion in the first direction to turn a document feeding direction of the document sheet;
a feeding unit configured to feed, along the feeding path, the document sheet with long sides thereof along the first direction; and
a driving motor disposed within a range corresponding to the width of the feeding path in a second direction perpendicular to the first direction, and such that a part thereof protrudes downwardly from a lower surface of the ADF unit, at an outer side relative to the curved part in the first direction, the driving motor being configured to provide a driving force to the feeding unit; and a main body unit comprising:
a reading unit configured to read an image of the document sheet fed by the ADF unit;
an accommodation unit configured to accommodate a recording sheet with long sides thereof along the first direction;
an image forming unit configured to feed, from the accommodation unit, a recording sheet in a predetermined sheet feeding direction and form an image on the recording sheet;
a contact glass disposed on an upper surface of the main body unit, the contact glass being configured such that a document sheet is placed thereon, the reading unit being disposed under the contact glass, the reading unit being further configured to read an image of the document sheet placed on the contact glass; and
a recessed portion formed at a portion on the upper surface of the main body unit, the portion on the upper surface of the main body unit corresponding to a position of the lower surface of the ADF unit where the driving motor is disposed, the recessed portion being configured to accommodate the part of the driving motor that protrudes downwardly from the lower surface of the ADF unit.

2. The multifunction peripheral according to claim 1, wherein the image forming unit is configured to feed the recording sheet in the sheet feeding direction intersecting the document feeding direction in which the ADF unit feeds the document sheet.

3. The multifunction peripheral according to claim 1, wherein the ADF unit comprises:
a first transmission mechanism extending in the first direction along the feeding path, the first transmission mechanism being configured to transmit the driving force from the driving motor to the feeding unit;
a second transmission mechanism extending in the first direction from a driving shaft of the driving motor, in a position different from a position of the first transmission mechanism in the second direction, the second transmission mechanism being configured to transmit the driving force from the driving motor; and
a third transmission mechanism having a thickness corresponding to a distance between the first transmission mechanism and the second transmission mechanism in the second direction, the third transmission mechanism being configured to contact a driving element disposed at an end of the first transmission mechanism and a driving element disposed at an end of the second transmission mechanism.

4. The multifunction peripheral according to claim 3, wherein the first transmission mechanism comprises a first gear train that extends in the first direction along the feeding path, the first gear train configured to transmit the driving force from the driving motor to the feeding unit,
wherein the second transmission mechanism comprises a second gear train that extends in the first direction from the driving shaft of the driving motor, in a position different from a position of the first gear train in the second direction, the second gear train being configured to transmit the driving force from the driving motor, and
wherein the third transmission mechanism comprises a transmission gear that has a thickness corresponding to a distance between the first gear train and the second gear train in the second direction, the transmission gear being configured to contact a gear disposed at an end of the first gear train and a gear disposed at an end of the second gear train.

5. The multifunction peripheral according to claim 4, further comprising a joint member configured to movably support the ADF unit to be openable and closeable relative to the main body unit between a closed position where the ADF unit covers the upper surface of the main body unit and an open position where the upper face of the main body unit is exposed, the joint member is disposed at a corner of the upper face of the main body unit where the driving motor and the first gear train are disposed to be adjacent to each other.

6. The multifunction peripheral according to claim 5, wherein the joint member comprises a hinge member having a rotational shaft configured to rotatably support the ADF unit to be openable and closeable.

7. The multifunction peripheral according to claim 6, wherein the hinge member is movable within a predetermined range along an end of the contact glass in a vertical direction, the hinge member being configured to keep the rotational shaft higher than the upper surface of the main body unit even when being at a lowermost level within the predetermined range.

8. The multifunction peripheral according to claim 1, wherein the first direction is perpendicular to a vertical direction,
wherein the second direction is perpendicular to the first direction and the vertical direction, and
wherein the main body unit is disposed under the ADF unit.

9. A multifunction peripheral comprising:
an ADF unit configured to feed a rectangular document sheet to be read, the ADF unit comprising:
a feeding path extending along a first direction and having a width in a second direction perpendicular to the first direction, the feeding path comprising a curved part provided at an end portion in the first direction to turn a document feeding direction of the document sheet;
a feeding unit configured to feed, along the feeding path, the document sheet; and
a driving motor disposed within a range corresponding to the width of the feeding path in the second direction such that a part thereof protrudes downwardly from a lower surface of the ADF unit, at an outer side relative to the curved part in the first direction, the driving motor being configured to provide a driving force to the feeding unit; and
a main body unit comprising:
a reading unit configured to read an image of the document sheet fed by the ADF unit;
an accommodation unit configured to accommodate a recording sheet;
an image forming unit configured to feed, from the accommodation unit, a recording sheet in a predetermined sheet feeding direction and form an image on the recording sheet, the predetermined sheet feeding direction being different from the document feeding direction;
a contact glass disposed on an upper face of the main body unit, the contact glass being configured to receive placement of a document sheet thereon, the reading unit being disposed under the contact glass, the reading unit being further configured to read an image of the document sheet placed on the contact glass; and a recessed portion formed at a portion on the upper face of the main body unit, the portion on the upper face of the main body unit corresponding to a position on the lower surface of the ADF unit where the driving motor is disposed, the recessed portion being configured to accommodate the part of the driving motor that protrudes downwardly from the lower surface of the ADF unit.

10. The multifunction peripheral according to claim 9, wherein the image forming unit is configured to feed the recording sheet in the sheet feeding direction intersecting the document feeding direction in which the ADF unit feeds the document sheet.

11. The multifunction peripheral according to claim 9, wherein the ADF unit comprises:
   a first transmission mechanism extending in the first direction along the feeding path, the first transmission mechanism being configured to transmit the driving force from the driving motor to the feeding unit;
   a second transmission mechanism extending in the first direction from a driving shaft of the driving motor, in a position different from a position of the first transmission mechanism in the second direction, the second transmission mechanism being configured to transmit the driving force from the driving motor; and
   a third transmission mechanism having a thickness corresponding to a distance between the first transmission mechanism and the second transmission mechanism in the second direction, the third transmission mechanism being configured to contact a driving element disposed at an end of the first transmission mechanism and a driving element disposed at an end of the second transmission mechanism.

12. The multifunction peripheral according to claim 11, wherein the first transmission mechanism comprises a first gear train that extends in the first direction along the feeding path, the first gear train configured to transmit the driving force from the driving motor to the feeding unit,
   wherein the second transmission mechanism comprises a second gear train that extends in the first direction from the driving shaft of the driving motor, in a position different from a position of the first gear train in the second direction, the second gear train being configured to transmit the driving force from the driving motor, and
   wherein the third transmission mechanism comprises a transmission gear that has a thickness corresponding to a distance between the first gear train and the second gear train in the second direction, the transmission gear being configured to contact a gear disposed at an end of the first gear train and a gear disposed at an end of the second gear train.

13. The multifunction peripheral according to claim 12, further comprising a joint member configured to movably support the ADF unit to be openable and closeable relative to the main body unit between a closed position where the ADF unit covers the upper face of the main body unit and an open position where the upper face of the main body unit is exposed, the joint member is disposed at a corner of the upper face of the main body unit where the driving motor and the first gear train are disposed to be adjacent to each other.

14. The multifunction peripheral according to claim 13, wherein the joint member comprises a hinge member having a rotational shaft configured to rotatably support the ADF unit to be openable and closeable.

15. The multifunction peripheral according to claim 14, wherein the hinge member is movable within a predetermined range along an end of the contact glass in a vertical direction, the hinge member being configured to keep the rotational shaft higher than the upper face of the main body unit even when being at a lowermost level within the predetermined range.

16. The multifunction peripheral according to claim 9, wherein the first direction is perpendicular to a vertical direction,
   wherein the second direction is perpendicular to the first direction and the vertical direction, and
   wherein the main body unit is disposed under the ADF unit.

17. The multifunction peripheral according to claim 9, wherein the image forming unit is configured to feed the recording sheet along an image forming feed path, and
   wherein a width of the image forming feed path and a width of the sheet feed path are the same.

* * * * *